(12) United States Patent
Feng et al.

(10) Patent No.: US 11,232,175 B2
(45) Date of Patent: Jan. 25, 2022

(54) METHOD, SYSTEM, AND COMPUTER PROGRAM PRODUCT FOR DETERMINING CAUSALITY

(71) Applicant: NEC CORPORATION, Tokyo (JP)

(72) Inventors: Lu Feng, Beijing (CN); Chunchen Liu, Beijing (CN); Wenjuan Wei, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/763,585

(22) PCT Filed: Mar. 28, 2019

(86) PCT No.: PCT/CN2019/080250
§ 371 (c)(1),
(2) Date: May 13, 2020

(87) PCT Pub. No.: WO2020/191770
PCT Pub. Date: Oct. 1, 2020

(65) Prior Publication Data
US 2020/0380064 A1 Dec. 3, 2020

(51) Int. Cl.
*G06F 17/16* (2006.01)
*G06N 5/02* (2006.01)
(52) U.S. Cl.
CPC .............. *G06F 17/16* (2013.01); *G06N 5/025* (2013.01)
(58) Field of Classification Search
CPC ......... G06F 17/16; G06F 17/10; G06N 5/025; G06N 5/04; G06N 7/005
(Continued)

(56) References Cited

U.S. PATENT DOCUMENTS 10,474,523 B1 * 11/2019 Taig ...................... G06F 11/263
10,810,790 B1 * 10/2020 Mosterman ............... G06F 8/35
(Continued)

FOREIGN PATENT DOCUMENTS

| CN | 102693262 A | 9/2012 |
| CN | 106156067 A | 11/2016 |
| CN | 109598347 A | 4/2019 |

OTHER PUBLICATIONS

International Search Report of PCT/CN2019/080250 dated Aug. 30, 2019 [PCT/ISA/210].

(Continued)

*Primary Examiner* — Tan V Mai
(74) *Attorney, Agent, or Firm* — Sughrue Mion, PLLC

(57) ABSTRACT

Implementations of the present disclosure relate to a method, system and program product for determining a causality between a plurality of variables. A method is provided for determining a causality between a plurality of vectors, which comprises: in response to a data set of a plurality of samples associated with the plurality of variables being collected, obtaining a matrix describing the causality between the plurality of variables, each sample among the plurality of samples comprising data that corresponds to the plurality of variables; determining a fitness degree and an expert knowledge constraint which are associated with the causality based on the data set and the matrix, wherein the expert knowledge constraint comprises at least one of an edge constraint on a direct causality between two variables in the matrix and a path constraint on an indirect causality between two variables in the matrix; building a problem formula describing the causality according to the determined fitness degree and expert knowledge constraint; and solving the built problem formula so as to obtain a candidate result
(Continued)

of the matrix. Further, there is provided a corresponding system and computer program product.

16 Claims, 8 Drawing Sheets

(58) Field of Classification Search
USPC .......................................................... 708/520
See application file for complete search history.

(56) References Cited

U.S. PATENT DOCUMENTS

2017/0004231 A1    1/2017  Avron et al.
2019/0102680 A1*  4/2019  Liu .......................... G06N 5/02

OTHER PUBLICATIONS

Written Opinion of PCT/CN2019/080250 dated Aug. 30, 2019 [PCT/ISA/237].

* cited by examiner

METHOD, SYSTEM, AND COMPUTER PROGRAM PRODUCT FOR DETERMINING CAUSALITY

CROSS REFERENCE TO RELATED APPLICATIONS

This application is a National Stage of International Application No. PCT/CN2019/080250, filed Mar. 28, 2019.

FIELD

Various implementations of the present disclosure relate to a probability model, and more specifically, to a method, system and computer program product for determining a causality.

BACKGROUND

A probability model is a graphical network model obtained based on probabilistic inference, which refers to obtaining association relationships between a plurality of variables by analyzing collected information that corresponds to these variables. Bayesian networks are probabilistic models proposed for solving uncertainty and incompleteness, which have been widely used in a plurality of areas.

A Bayesian network may describe causalities between a plurality of variables via a directed acyclic graph (DAG) which may comprise nodes representing variables as well as directed edges and paths representing causalities between these variables. For example, a directed edge of a parent node pointing to its child node may indicate: a variable represented by the parent node and a variable represented by the child node have a direct causality. In another example, a path of one node pointing to another node may indicate: variables represented by these two nodes have an indirect causality. Bayesian networks are applicable to express and analyze uncertain and probabilistic events and may be determined from incomplete, inexact or uncertain information that is collected corresponding to a plurality of variables.

Technical solutions have been developed for determining a causality based on collected data sets and expert knowledge. However, these technical solutions impose requirements that are too harsh on expert knowledge or may involve interaction with experts during determination of the causality. Therefore, a focus of research has become an easy and effective way for determining a causality between a plurality of variables based on expert knowledge (which may be imperfect).

SUMMARY

Expert knowledge can improve accuracy of the causality between a plurality of variables determined purely based on data sets to some extent. Therefore, it is desirable to develop and implement a technical solution for determining a causality based on expert knowledge more accurately and effectively. It is desired that the technical solution can use expert knowledge to guide a learning process of the causality as much as possible.

According to a first aspect of the present disclosure, a method is provided for determining a causality between a plurality of vectors. The method comprises: in response to a data set of a plurality of samples associated with the plurality of variables being collected, obtaining a matrix describing the causality between the plurality of variables, each sample among the plurality of samples comprising data that corresponds to the plurality of variables; determining a fitness degree and an expert knowledge constraint which are associated with the causality based on the data set and the matrix, where the expert knowledge constraint comprises at least one of an edge constraint on a direct causality between two variables in the matrix and a path constraint on an indirect causality between two variables in the matrix; building a problem formula describing the causality according to the determined fitness degree and expert knowledge constraint; and solving the built problem formula so as to obtain a candidate result of the matrix.

According to a second aspect of the present disclosure, a system is provided for determining a causality between a plurality of variables, the system comprising: one or more processors; a memory coupled to at least one processor of the one or more processors; computer program instructions stored in the memory which, when executed by the at least one processor, cause the system to execute a method for determining a causality between a plurality of variables. The method comprises: in response to a data set of a plurality of samples associated with the plurality of variables being collected, obtaining a matrix describing the causality between the plurality of variables, each sample among the plurality of samples comprising data that corresponds to the plurality of variables; determining a fitness degree and an expert knowledge constraint which are associated with the causality based on the data set and the matrix, where the expert knowledge constraint comprises at least one of an edge constraint on a direct causality between two variables in the matrix and a path constraint on an indirect causality between two variables in the matrix; building a problem formula describing the causality according to the determined fitness degree and expert knowledge constraint; and solving the built problem formula so as to obtain a candidate result of the matrix.

According to a third aspect of the present disclosure, a device is provided for determining a causality between a plurality of vectors. The device comprises: an obtaining module configured to, in response to a data set of a plurality of samples associated with the plurality of variables being collected, obtain a matrix describing the causality between the plurality of variables, each sample among the plurality of samples comprising data that corresponds to the plurality of variables; a determining module configured to determine a fitness degree and an expert knowledge constraint which are associated with the causality based on the data set and the matrix, where the expert knowledge constraint comprises at least one of an edge constraint on a direct causality between two variables in the matrix and a path constraint on an indirect causality between two variables in the matrix; a building module configured to build a problem formula describing the causality according to the determined fitness degree and expert knowledge constraint; and a solving module configured to solve the built problem formula so as to obtain a candidate result of the matrix.

According to a fourth aspect of the present disclosure, a computer program product is provided. The computer program product comprises a computer-readable storage medium with a computer-readable program stored thereon, where the computer-readable program, when executed on a computing device, causes a computing device to implement the method for determining a causality between a plurality of variables.

By means of the technical solution for determining causality between a plurality of variables as described in the present disclosure, it is possible to give corresponding constraints for an edge and a path in a directed graph based on expert knowledge and further for a more accurately determined causality.

BRIEF DESCRIPTION OF THE DRAWINGS

Through the more detailed description in the accompanying drawings, features, advantages and other aspects of implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, these implementations are provided to make the present disclosure more thorough and complete and to fully convey the scope of the present disclosure to those skilled in the art.

Figure 1:
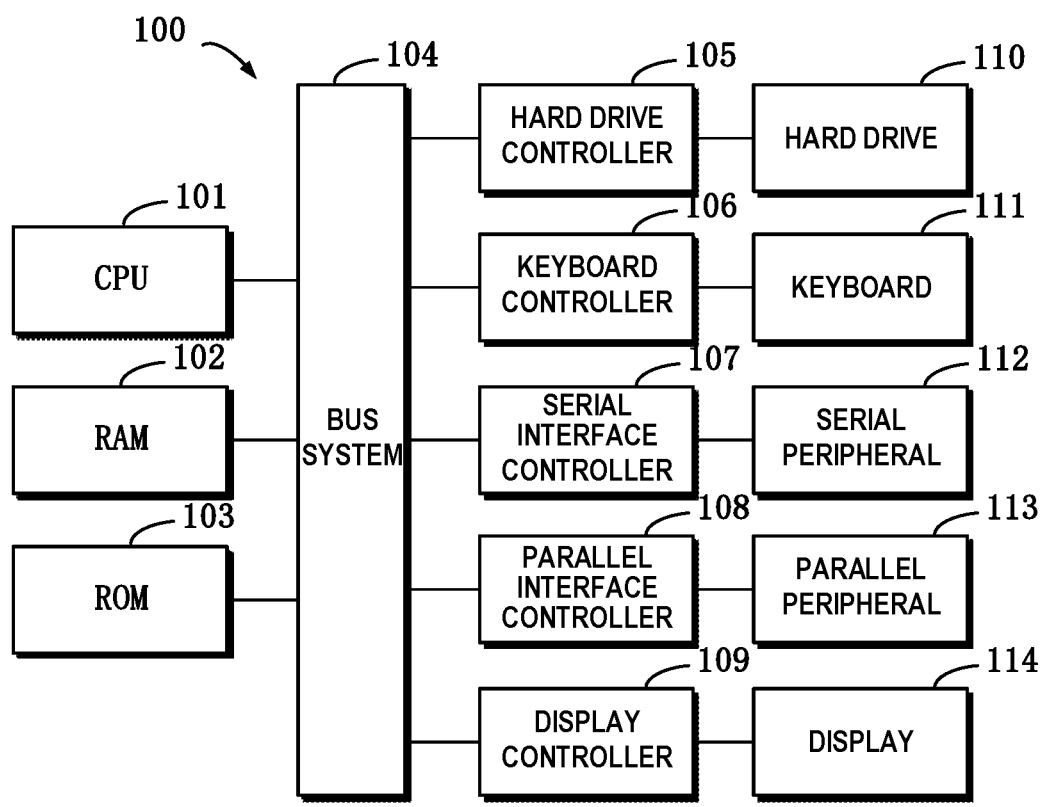
FIG. 1 schematically shows a block diagram of an example computing system which is applicable to implement implementations of the present invention.

FIG. 1 illustrates an example computing system 100 which is applicable to implement implementations of the present invention. As illustrated in FIG. 1, the computer system 100 may include: a CPU (Central Process Unit) 101, RAM (Random Access Memory) 102, ROM (Read Only Memory) 103, Bus System 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106, Serial Peripheral Equipment 112 is coupled to Serial Interface Controller 107, Parallel Peripheral Equipment 113 is coupled to Parallel Interface Controller 108, and Display 114 is coupled to Display Controller 109. It should be understood that the structure as illustrated in FIG. 1 is only for exemplary purposes rather than limiting the scope of the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, in some implementations, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium other than a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire-line, optical fiber cable, RF, etc., or any suitable combination of the foregoing.

Computer program code for carrying out operations for the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the scenario related to the remote computer, the remote computer may be connected to the user's computer through any type of network, including a local area network (LAN) or a wide area network (WAN), or a connection may be made to an external computer (for example, through the Internet using an Internet Service Provider).

Aspects of the present disclosure are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or another programmable data processing apparatus to produce a machine, such that the instructions, which execute via the processor of the computer or the other programmable data processing apparatus, create means for implementing the functions/acts specified in the flowchart and/or block diagram block or blocks.

These computer program instructions may also be stored in a computer-readable medium that can direct a computer, another programmable data processing apparatus, or other devices to function in a particular manner, such that the instructions stored in the computer-readable medium produce an article of manufacture including instructions which implement the functions/acts specified in the flowchart and/or block diagram block or blocks.

The computer program instructions may also be loaded onto a computer, another programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For the sake of description, first an introduction is given to an example of a specific application environment of the present disclosure. Causality analysis based on a Bayesian network may be applied in various application environments. For example, in an application environment for monitoring whether a control system in a specific area is abnormal, information (e.g., information collected at different time points) corresponding to a plurality of variables (e.g., temperature, humidity, . . . , at a specified location in the specific area and whether the control system is abnormal) may be collected, respectively. There is no limit to the number of variables p, but there may be several variables in a simple application environment, and the number of variables p may reach dozens or even more in a complex application environment.

Information corresponding to variables which is collected at one time point may be stored into one sample (a vector comprising a plurality of dimensions), and at this point information collected at n time points may be stored into n samples (here, the n samples may be referred to as a collected data set). Subsequently, the collected data set may be used as input to determine a causality between temperature, humidity and the like at various locations in the area and whether the control system is abnormal.

For the sake of description below, how to determine whether the control system is abnormal is used as a specific example for illustrating a determination of the causality in the context of the present disclosure. According to other implementations of the present disclosure, the technical solution of the present disclosure may be applied in more application environments. For example, in an application environment for determining a causality between sales of a specific product (e.g., beer) and variables (the price of beer, temperature, time, country and other information), a data set comprising sales and various other variables may be collected, and then the causality between sales of beer and other variables may be determined based on the data set. In another example, in an application environment for determining a causality between a car insurance premium and variables (e.g., the car's brand, model and airbag number, gender and age of the insurance applicant, etc.), a data set comprising the insurance premium and the various other variables may be collected, and then the causality between the insurance premium and the other variables may be determined based on the data set.

In the context of the present disclosure, the Bayesian network is used as one specific example of a causality to describe specific details of the present disclosure. Here, the Bayesian network is a graphical probabilistic network model defined based on a directed graph. The directed graph may be presented using a matrix. Specifically, suppose in the application environment for determining whether the control system is abnormal, there exist the following p variables: temperature, humidity, . . . , whether the control system is abnormal. At this point, a data set comprising n samples may be represented as Table 1.

TABLE 1

Example of Data Set

| Variable $x_1$ = temperature (° C.) | Variable $x_2$ = humidity (%) . . . | Variable $x_p$ = being abnormal (true/false) |
|---|---|---|
| T1 | M1 . . . | E1 |
| T2 | M2 . . . | E2 |
| . . . | . . . . . . | . . . |
| Tn | Mn . . . | E3 |

As shown in Table 1, the first column "variable $x_1$=temperature" indicates that the first variable among p variables is "temperature," that is, temperature values measured at different time points. The second column "variable $x_2$=humidity" indicates that the second variable among p variables is "humidity," that is, humidity values measured at different time points. The last column "variable $x_p$=being abnormal" indicates that the $p^{th}$ variable among p variables is "being abnormal or not," that is, whether the control system is abnormal at different time points. Causalities between the above p variables may be represented using a matrix B as below.

$$B = \begin{bmatrix} \beta_{1,1} & \cdots & \beta_{1,p} \\ \vdots & \ddots & \vdots \\ \beta_{p,1} & \cdots & \beta_{p,p} \end{bmatrix}$$

For example, matrix B is a p-order matrix including p×p elements, each element indicates whether there is a causality between two variables corresponding to a location of the element. Specifically, the variable $\beta_{ji}$ in the matrix B represents a causality between the $j^{th}$ variable and the $i^{th}$ variable among p variables. It should be noted that if locations of the two variables differ, then the causality also differs. Therefore, $\beta_{ji}$ and $\beta_{ij}$ represent different causalities. In other words, edges in the directed graph represented by the matrix B have different directions. Moreover, a diagonal in the matrix B represents causalities between each element and itself. However, there is no causality between a specific element and itself, a value of the element at the diagonal should be set to 0.

As seen from the above description, in the Bayesian network, the problem for determining causalities between p variables based on a collected data set may be converted into a procedure for solving a matrix describing causalities between a plurality of elements. By now technical solutions have been proposed to solve a matrix by building problem formulas based on a data set and expert knowledge. However, existing technical solutions impose requirements that are too harsh on expert knowledge, and it is difficult to obtain expert knowledge that meets such harsh requirements.

For example, in one technical solution, expert knowledge not only needs to describe whether there is causality between two variables, but also has to describe the probability that the two variables have the causality between them. It is understood that expert knowledge is still limited and incomplete in most of existing application environments. For example, in the above application environment for determining the car insurance premium, there may only exist the following limited expert knowledge: the gender and age of the insurance applicant have no direct causality, and the airbag number and the car insurance premium have direct causality, etc. In existing technical solutions based on expert knowledge, such limited expert knowledge cannot provide all necessary information, and thereby cannot be used to help the causality determination.

To solve drawbacks in the above technical solutions, according to one implementation of the present disclosure, a method is proposed for determining a causality between a plurality of variables. In the technical solution, a concept of expert knowledge constraints is introduced during building problem formulas. Here, the expert knowledge constraint comprises two types of constraint: 1) an edge constraint on a direct causality between two variables in a matrix describing a directed graph; and 2) a path constraint on an indirect causality between two variables in the matrix.

It should be noted that according to one implementation of the present disclosure, edge constraints and path constraints are determined based on existing (perhaps incomplete) expert knowledge. Therefore, according to the present disclosure, it is possible to easily and effectively help the causality determination between a plurality of variables by means of expert knowledge, without a need for complete expert knowledge for the plurality of variables.

Specifically, according to one implementation of the present disclosure, a method is proposed for determining a causality between a plurality of variables. The method comprises: in response to a data set of a plurality of samples associated with the plurality of variables being collected, obtaining a matrix that describes the causality between the plurality of variables, each sample among the plurality of samples comprising data that corresponds to the plurality of variables; determining a fitness degree and an expert knowledge constraint associated with the causality based on the data set and the matrix, where the expert knowledge constraint comprises at least one of an edge constraint on a direct causality between two variables in the matrix and a path constraint on an indirect causality between two variables in the matrix; building a problem formula that describes the causality according to the determined fitness degree and expert knowledge constraint; and solving the built problem formula so as to obtain a candidate result of the matrix.

Figure 2:
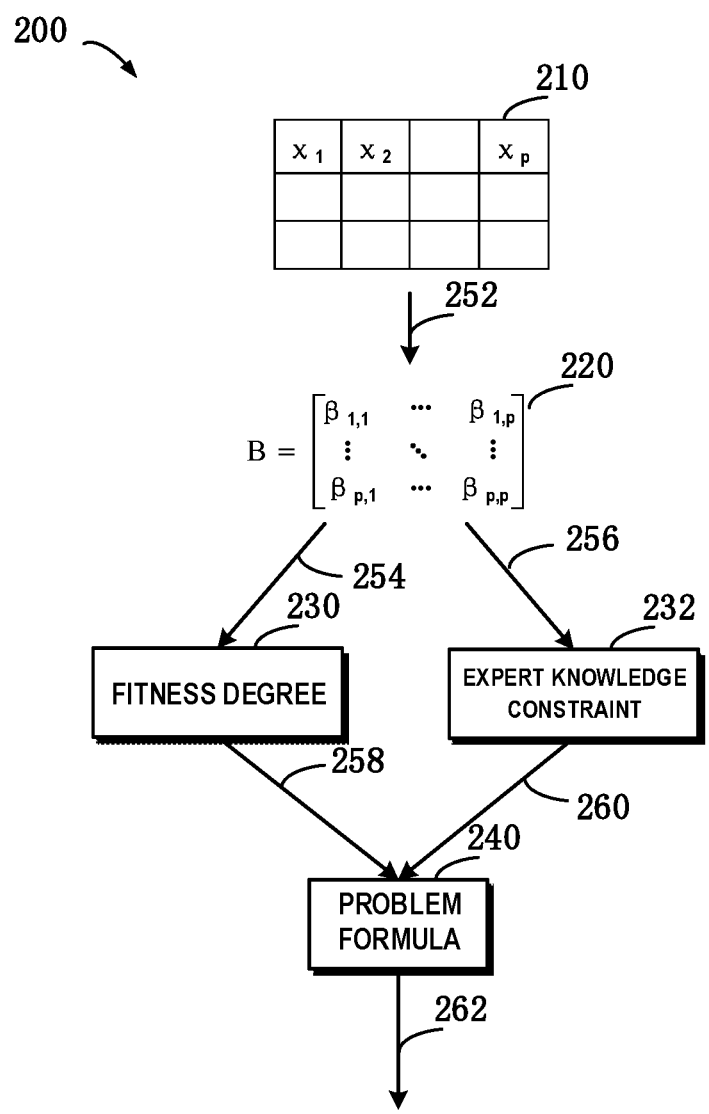
FIG. 2 schematically shows a block diagram for determining a causality between a plurality of variables according to one implementation of the present disclosure.

With reference to FIG. 2, a brief description is presented to steps according to one implementation of the present disclosure. FIG. 2 schematically shows a block diagram 200 for determining causality between a plurality of variables according to one implementation of the present disclosure. As depicted, a data set 210 (e.g., the data set shown in Table 1) of a plurality of samples (n samples) associated with the plurality of variables may be collected. A matrix 220 (e.g., matrix B described above) describing the causality between the plurality of variables may be obtained (as shown by an arrow 252), each sample among the plurality of samples comprising data that corresponds to the plurality of variables. At this point, values of various elements in the built matrix are unknown and are be obtained through a solving procedure below (as shown by an arrow 262).

As shown by arrows 254 and 256, a fitness degree 230 and an expert knowledge constraint 232 which are associated with the causality are determined based on the data set 210 and the matrix 220. The expert knowledge constraint 232 comprises at least one of an edge constraint on a direct causality between two variables in the matrix and a path constraint on an indirect causality between two variables in the matrix. As shown by arrows 258 and 260, a problem formula 240 describing the causality may be built based on the determined fitness degree 230 and expert knowledge constraint 232. Finally, as shown by the arrow 262, the built problem formula 240 is built to obtain a candidate result of the matrix 220. At this point, the candidate result represents a specific value of each element in the matrix 220.

Figure 3:
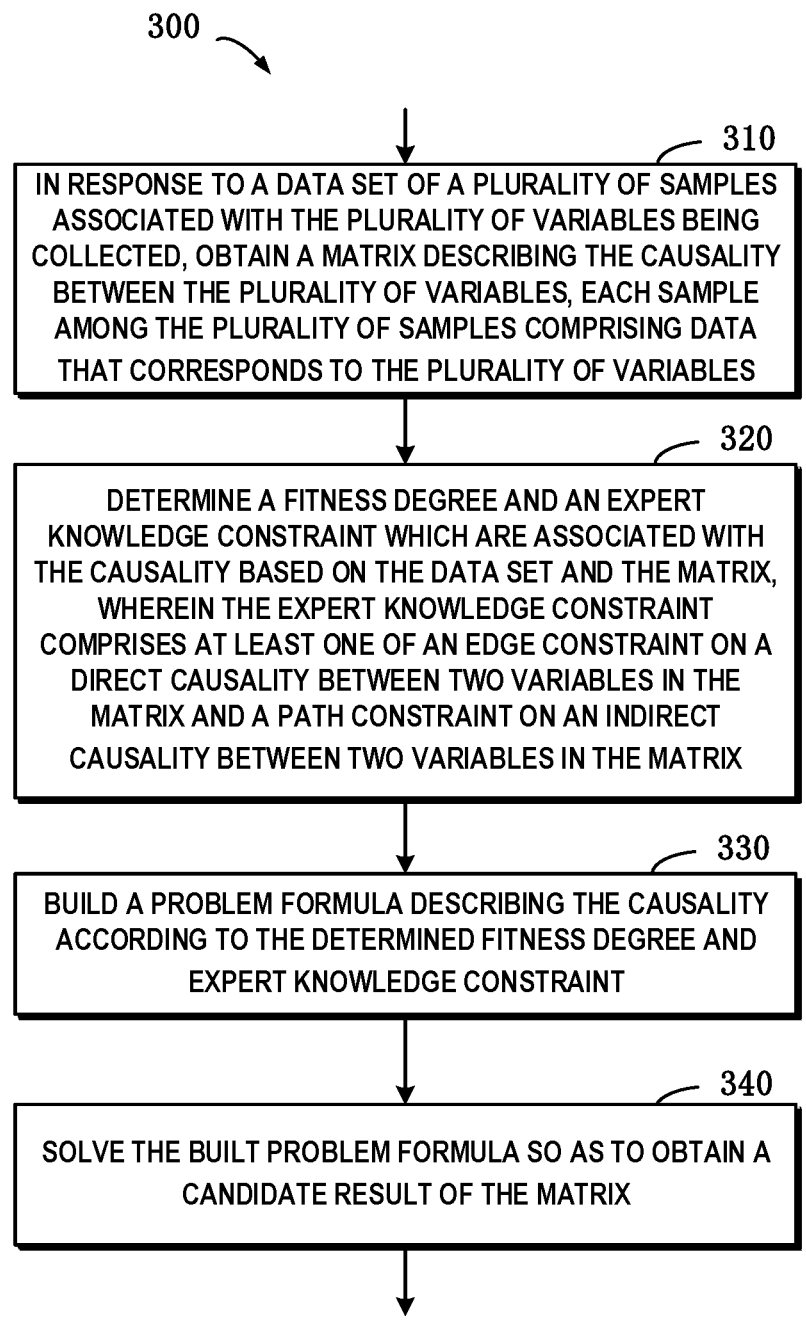
FIG. 3 schematically shows a flowchart of a method for determining a causality between a plurality of variables.

FIG. 3 schematically shows a flowchart of a method 300 for determining a causality between a plurality of variables according to one implementation of the present disclosure. First, at block 310, in response to a data set 210 of a plurality of samples associated with the plurality of variables being collected, a matrix 220 describing the causality between the plurality of variables is obtained, each sample among the plurality of samples comprising data that corresponds to the plurality of variables.

Here, the data set 210 is a set of sample data which is collected in an application environment. For example, in the above application environment for determining whether the control system is abnormal, the data set 210 may be the data set shown in Table 1, where each row represents one sample. Each sample comprises measured values of p variables $x_1$, $x_2$, . . . , $x_p$. At this point, a matrix 220 (e.g., matrix B described above) describing the causality between the p variables may be obtained. It should be noted that the value of each element in the matrix 220 is unknown here, but it may be considered that values of variables are unknown numbers. In subsequent steps, a problem formula may be built and solved so as to obtain the candidate result of the matrix (i.e., the value of each element in the matrix). Since the causality between the plurality of variables is described by the matrix 220, the candidate result of the matrix represents the causality.

At block 320, a fitness degree 230 and an expert knowledge constraint 232 which are associated with the causality are determined based on the data set 210 and the matrix 220, where the expert knowledge constraint 232 comprises at least one of an edge constraint on a direct causality between two variables in the matrix and a path constraint on an indirect causality between two variables in the matrix.

The matrix 220 may be provided in the form of matrix B, where the matrix 220 may comprise p vectors each of which is as shown by one row in the matrix 220. For brevity of the description, specific details according to one implementation of the present disclosure will be illustrated by taking a three-dimensional matrix where p=3 as a specific example of the matrix describing the causality. At this point, the data set 210 may be represented as Table 2.

TABLE 2

Example of Data Set

| Variable $x_1$ = temperature (° C.) | Variable $x_2$ = humidity (%) | ... | Variable $x_3$ = being abnormal (true/false) |
|---|---|---|---|
| T1 | M1 | ... | E1 |
| T2 | M2 | ... | E2 |
| ... | ... | ... | ... |
| Tn | Mn | ... | E3 |

When p=3, the matrix may be represented as:

$$M = \begin{bmatrix} 0 & \beta_{1,2} & \beta_{1,3} \\ \beta_{2,1} & 0 & \beta_{2,3} \\ \beta_{3,1} & \beta_{3,2} & 0 \end{bmatrix}$$

At this point, various vectors in matrix M are shown as below:

The first vector: $\beta_1 = [0 \ \beta_{1,2} \ \beta_{1,3}]$;
The second vector: $\beta_2 = [\beta_{2,1} \ 0 \ \beta_{2,3}]$;
The third vector: $\beta_3 = [\beta_{3,1} \ \beta_{3,2} \ 0]$.

According to implementations of the present disclosure, the fitness degree 230 and the expert knowledge constraint 232 may be determined for each vector among the plurality of vectors in the matrix. Detailed description will be presented with reference to specific formulas. At block 330, the problem formula 240 describing the causality may be built according to the determined fitness degree 230 and expert knowledge constraint 232. At block 340, the built problem formula 240 is solved so as to obtain the candidate result of the matrix 220. It should be noted that here the candidate result comprises values of various elements in the matrix 220. By means of the candidate result, the matrix 220 describing the causality between the plurality of variables may be obtained, and further a directed graph about relationships between variables may be obtained. Since the matrix 220 comprises the plurality of vectors $\beta_1$, $\beta_2$ and $\beta_3$, a fitness degree and an expert knowledge constraint may be determined for each vector, respectively.

Figure 4:
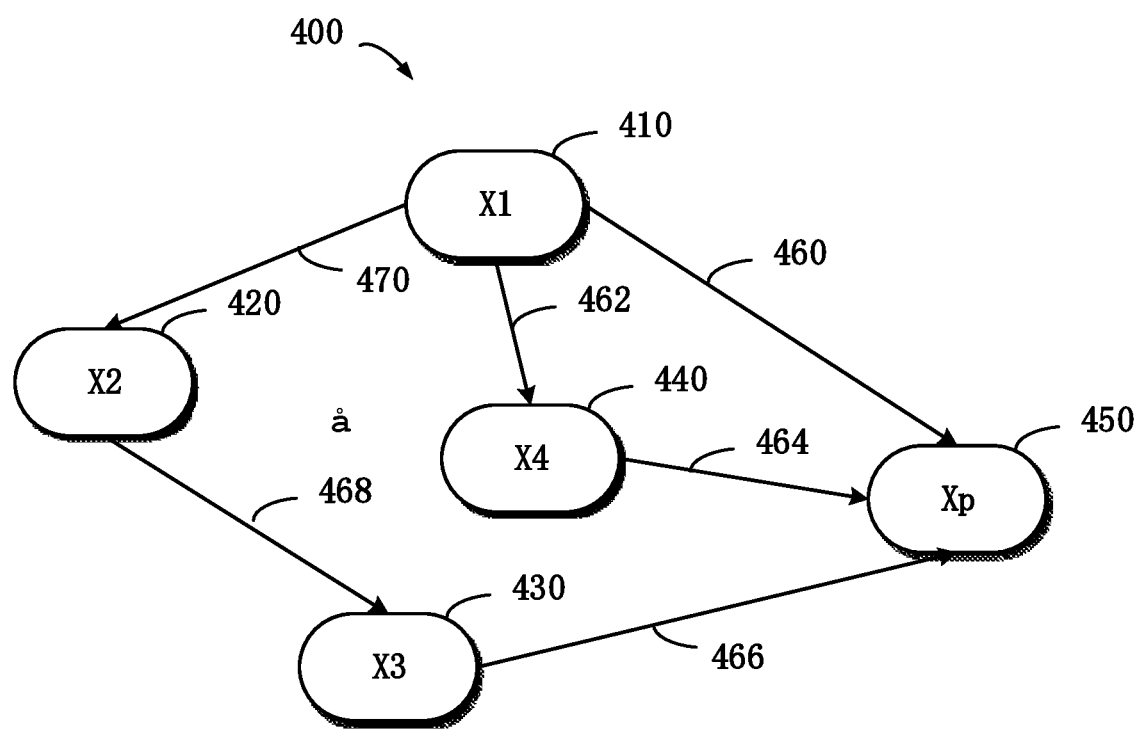
FIG. 4 schematically shows an example of a directed graph associated with a matrix according to one implementation of the present disclosure.

According to one implementation of the present disclosure, the edge constraint and the path constraint may be set for a direct causality and an indirect causality between two variables in the matrix, respectively. The concepts of the direct causality and indirect causality will be described with reference to FIG. 4. This figure schematically shows an example of a directed graph 400 associated with the matrix according to one implementation of the present disclosure. Specifically, the directed graph is associated with, for example, matrix B. Nodes 410, 420, 430, 440, ..., 450 in the directed graph 400 represent variables $x_1$, $x_2$, $x_3$, $x_4$, ..., $x_p$, respectively. Each of the directed edges 460, 462, 464, 466, 468 and 470 indicates that variables represented by two nodes at two ends of the directed edge have a causality between them.

For example, the directed edge 460 pointing to the node 450 from the node 410 indicates that variable $x_1$ has a direct causality with variable $x_p$, in other words, variable $x_1$ is a direct reason of variable $x_p$. In the directed graph 400, a path comprises a series of edges and indicates that two nodes at two ends of the path have an indirect causality with them. Specifically, there are two paths from the node 410 to the node 450, among which the first path comprises the edges 470, 468 and 466 and the second path comprises the edges 462 and 464. Here, the two paths indicate that there is an indirect causality between the variable $x_1$ represented by the node 410 and the variable $x_p$ represented by the node 450. Here, the number of edges comprised in a path may be referred to as path length. For example, the first path has a length of 3, and the second path has a length of 2.

Description is presented below on how to build a problem formula with reference to a specific example. According to one implementation of the present disclosure, the problem formula may comprise the fitness degree and expert knowledge constraint associated with the causality. Since the matrix 220 comprises the plurality of vectors $\beta_1$, $\beta_2$ and $\beta_3$, a fitness degree and an expert knowledge constraint may be determined for each vector. According to one implementation of the present disclosure, the problem formula may be built using Formula 1 below:

$$\min_{\beta_1, \ldots, \beta_p} \sum_{j=1}^{p} \text{Fitness}_j + \text{Constraint}_j \qquad \text{Formula 1}$$

In Formula 1, $\beta_j$ represents a current vector among the plurality of vectors in the matrix, Fitness$_j$ and Constraint$_j$ represent a fitness degree and an expert knowledge constraint for the current vector $\beta_j$, respectively. In this implementation, Fitness$_j$ and Constraint$_j$ are both associated with the current vector $\beta_j$. Formula 1 may be solved so as to obtain a value that causes the problem formula to have a minimum value, and the value may be used as a candidate result of the current vector $\beta_j$. In this way, by solving with respect to each vector among the plurality of vectors in the matrix 220, values of various elements in the matrix 220 may be obtained.

Since the operation on each vector among the plurality of vectors is similar, one vector is taken as a specific example for describing details according to one implementation of the present disclosure. Specifically, with respect to the current vector $\beta_j$ among the plurality of vectors in the matrix 220, a fitness degree and an expert knowledge constraint may be determined for the current vector $\beta_j$, respectively.

Regarding each vector in the matrix, the fitness degree indicates a fitness relationship between a current column corresponding to the current vector $\beta_j$ and other columns in the data set. According to one implementation of the present disclosure, Fitness$_j$ for the current vector $\beta_j$ may be determined based on a 2-norm operation. Specifically, Fitness$_j$ for the current vector $\beta_j$ may be determined based on Formula 2 as below:

$$\text{Fitness}_j = \|x_j - x_{-j}\beta_j\|_2^2 \qquad \text{Formula 2}$$

In Formula 2, $x_j$ represents a portion associated with the current vector $\beta_j$ among the plurality of samples in the data set 210, $x_{-j}$ represents a represents a portion associated with vectors other than the current vector $\beta_j$ among the plurality of samples, $\beta_j$ represents the current vector, and $\| \|_2^2$ represents a 2-norm operation. For example, when j=1, $x_j$ represents values T1, T2, ..., Tn in the first column of "variable $x_1$=temperature" in the data set shown by Table 1; and $x_{-j}$ represents values in columns other than the first column in the data set shown by Table 1 (e.g., M1, M2, ..., Mn in the second column of "variable $x_2$=humidity", and E1, E2, ..., En in the p column of "variable $x_p$=being abnormal").

In Formula 2, $\|x_j - x_{-j}\beta_j\|_2^2$ represents a fitness degree associated with the current vector $\beta_j$, the fitness degree indicating a fitness relationship between the current column and another column in the matrix. The fitness degree is denoted in a 2-norm form, which may represent the fitness degree between $x_j$ and $x_{-j}\beta_j$. The smaller is the value of $\|x_j - x_{-j}\beta_j\|_2^2$, the higher is the fitness degree between them; and vice versa.

Description is presented on how to determine the edge constraint and the path constraint with reference to a specific example. According to one implementation of the present disclosure, an edge constraint matrix of a state of a direct causality between two variables among the plurality of variables may be determined based on expert knowledge; and the edge constraint may be determined based on the edge constraint matrix and the matrix.

In this implementation, the expert knowledge may comprise various factors. For example, in the application environment for determining whether the control system is abnormal, the expert knowledge may indicate: there is a direct causality between variable $x_1$ (temperature) and variable $x_p$ (being abnormal); there is an indirect causality between variable $x_2$ (humidity) and variable $x_p$ (being abnormal). At this point, the edge constraint in the directed graph for the matrix may be determined based on the above direct and indirect causality.

As compared with existing technical solutions for helping the causality determination based on expert knowledge, exact expert knowledge is not required in the context of the present disclosure. For example, expert knowledge only needs to generally indicate whether there is a causality between two variables, without a need for more description of the causality (e.g., without a need for a specific probability). In addition, after determining the edge constraint and the path constraint based on the expert knowledge, there is no need for extra interaction. Therefore, according to one implementation of the present disclosure, the requirement on completeness of the expert knowledge may be lowered, and it is possible to easily and effectively help the causality determination without extra interaction with experts.

Figure 5:
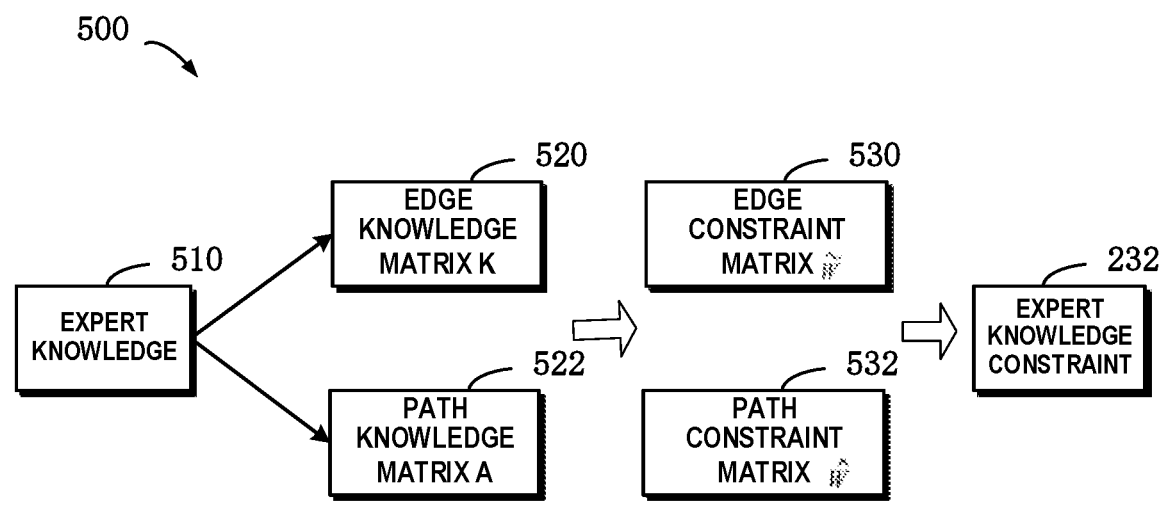
FIG. 5 schematically shows a block diagram of a solution for determining an expert knowledge constraint according to one implementation of the present disclosure.

FIG. 5 schematically shows a block diagram 500 of a solution for determining the expert knowledge constraint according to one implementation of the present disclosure. As depicted, an edge knowledge matrix 520 (e.g., denoted as matrix K) and a path knowledge matrix 522 (e.g., denoted as matrix A) may be respectively determined based on expert knowledge 510 (e.g., describing which variables have the direct causality and which variables have the indirect causality). Next, an edge constraint matrix 530 (e.g., denoted as matrix $\tilde{W}$) and a path constraint matrix 532 (e.g., denoted as matrix $\tilde{W}$) may be determined based on the edge knowledge matrix 520 and the path knowledge matrix 522, respectively. Furthermore, the expert knowledge constraint 232 may be determined based on the edge constraint matrix 530 and the path constraint matrix 532.

Description is presented on how to determine various matrices involved in FIG. 5 based on different examples. According to one implementation of the present disclosure, in order to introduce expert knowledge into the constraint, knowledge on an edge in the directed graph may be determined from the expert knowledge. Specifically, the edge knowledge matrix K describing a state of a direct causality between two variables among the plurality of variables may be determined based on the expert knowledge. According to one implementation of the present disclosure, each element $k_{ji}$ in the edge knowledge matrix K may be determined based on Formula 3 as below.

$$k_{ji} = \begin{cases} 1, \text{variable } xj \text{ and variable } xi \text{ have a direct causality} \\ 0, \text{variable } xj \text{ and variable } xi \text{ have no direct causality} \\ -1, \text{the expert knowledge includes no knowledge on} \\ \quad \text{a direct causality between variable } xj \text{ and variable } xi \end{cases} \quad \text{Formula 3}$$

In Formula 3, if the expert knowledge indicates a first variable (e.g., variable $x_j$) and a second variable (e.g., variable $x_i$) associated with an element have a direct causality, then the element $k_{ji}$ is set as satisfying a first condition (e.g., 1); in response to the expert knowledge indicating that the first variable and the second variable do not have a direct causality, the element $k_{ji}$ is set as satisfying a second condition; and in response to the expert knowledge including no knowledge on a direct causality between the first variable and the second variable, the element $k_{ji}$ is set as satisfying a third condition (e.g., −1).

According to one implementation of the present disclosure, a path knowledge matrix describing states of the indirect causality between two variables among the plurality of variables may be determined based on the expert knowledge. Specifically, each element $a_{ji}$ in the path knowledge matrix A may be determined based on Formula 4 as below.

$$a_{ji} = \begin{cases} 1, \text{variable } xj \text{ and variable } xi \text{ have a direct causality} \\ 0, \text{variable } xj \text{ and variable } xi \text{ have no direct causality} \\ -1, \text{the expert knowledge includes no knowledge on} \\ \quad \text{an indirect causality between variable } xj \text{ and variable } xi \end{cases} \quad \text{Formula 4}$$

In Formula 4, if the expert knowledge indicates a first variable (e.g., variable $x_j$) and a second variable (e.g., variable $x_i$) associated with an element have an indirect causality, then the element is set as satisfying a first condition (e.g., 1); in response to the expert knowledge indicating that the first variable and the second variable do not have an indirect causality, the element is set as satisfying a second condition; and in response to the expert knowledge including no knowledge on an indirect causality between the first variable and the second variable, the element is set as satisfying a third condition (e.g., −1).

It should be noted that although the elements $k_{ji}$ and $a_{ji}$ are set to 1, 0 and −1 under different conditions in the above formulas, in other specific implementations, the element $k_{ji}$ may further be set as satisfying other first, second and third conditions, as long as the three different conditions can be differentiated.

Detailed description has been presented on how to determine the edge knowledge matrix K and the path knowledge matrix A based on the expert knowledge. Next, an edge constraint matrix may be determined based on the edge knowledge matrix K and the path knowledge matrix A. Description is presented below on how to determine various elements in the edge knowledge matrix and the path knowledge matrix based on the edge knowledge matrix K and the path knowledge matrix A with reference to FIG. 6.

Figure 6:
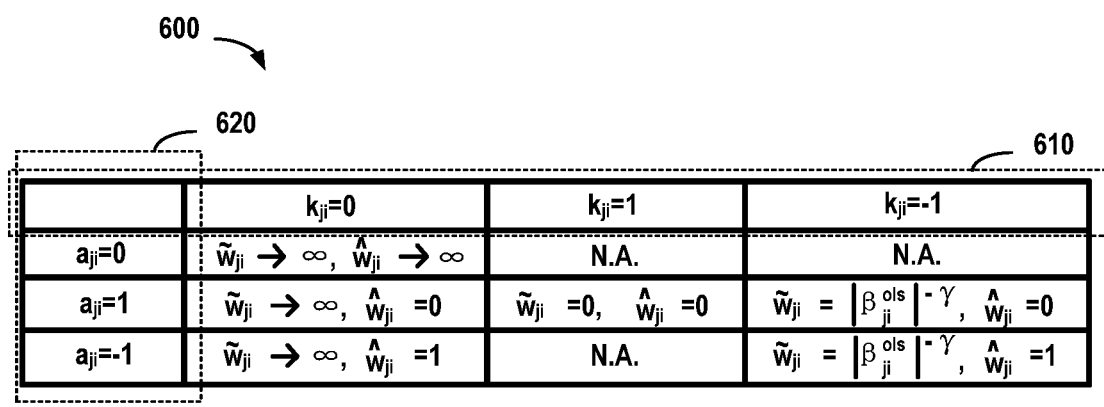
FIG. 6 schematically shows a block diagram for determining various elements in an edge constraint matrix and a path constraint matrix based on the edge knowledge matrix and the path knowledge matrix according to one implementation of the present disclosure.

FIG. 6 schematically shows a block diagram 600 for determining various elements in the edge constraint matrix and the path constraint matrix based on the edge knowledge matrix and the path knowledge matrix according to one implementation of the present disclosure. As depicted, a row 610 in the block diagram 600 shows possible values (e.g., 0, 1, −1) of various elements in the edge knowledge matrix K, and a column 620 shows possible values (e.g., 0, 1, −1) of various elements in the path knowledge matrix A. According to relationships shown in FIG. 6, elements in the edge constraint matrix may be determined based on the following method.

As shown by the second column ($k_{ji}=0$) in the block diagram 600, if the element $k_{ji}$ in the edge knowledge matrix K which corresponds to the element $\tilde{w}_{ji}$ satisfies the second condition (equaling 0), then the element $\tilde{w}_{ji}$ in the edge constraint matrix $\tilde{W}$ is set to a larger value. It will be understood that although a specific example of the larger value is infinitely large as shown in FIG. 6, $\tilde{w}_{ji}$ may further be set to another value in other implementations, as long as the value gives a greater penalty on the edge constraint.

As shown by the third column ($k_{ji}=1$) in the block diagram 600, if the element $k_{ji}$ in the edge knowledge matrix K which corresponds to the element $\tilde{w}_{ji}$ satisfies the first condition (e.g., equaling 1), the element $\tilde{w}_{ji}$ in the edge constraint matrix $\tilde{W}$ is set to zero.

As shown by the fourth column ($k_{ji}=-1$) in the block diagram 600, if the element $k_{ji}$ in the edge knowledge matrix K which corresponds to the element $\tilde{w}_{ji}$ satisfies the third condition, the element $\tilde{w}_{ji}$ in the edge constraint matrix $\tilde{W}$ is set to be associated with the corresponding element $\beta_{ji}$ in the matrix B.

According to one implementation of the present disclosure, the element $\tilde{w}_{ji}$ at the location (j, i) in the edge constraint matrix $\tilde{W}$ may be determined based on Formula 5 as below.

$$\tilde{w}_{ji}=|\rho_{ji}^{ols}|^{-\gamma} \qquad \text{Formula 5}$$

In Formula 5, $p_{ji}^{ols}$ is a predefined super-parameter calculated based on the data set, ols denotes a least square operation, | | denotes an absolute value operation, and γ denotes a predetermined parameter. In this implementation, a value of γ may be determined based on requirements of a specific application environment. Those skilled in the art may determine a value of $\rho_{ji}^{ols}$ based on related definitions in the prior art, which will not be detailed in implementations of the present disclosure.

According to one implementation of the present disclosure, according to relationships shown in FIG. 6, elements in the path constraint matrix may be determined based on the following method. As shown by the second row ($a_{ji}=0$) in the block diagram 600, in response to the element $a_{ji}$ in the path knowledge matrix A which corresponds to the element $\hat{w}_{ji}$ satisfying the second condition (e.g., equaling 0), the element $\hat{w}_{ji}$ in the path constraint matrix $\hat{W}$ is set to a larger value. It will be understood that although a specific example of the larger value is infinitely large as shown in FIG. 6, $\hat{w}_{ji}$ may further be set to another value in other implementations, as long as the value gives a greater penalty on the path constraint.

As shown by the third row ($a_{ji}=1$) in the block diagram 600, if the element $a_{ji}$ in the path knowledge matrix A which corresponds to the element $\hat{w}_{ji}$ satisfies the first condition (e.g., equaling 1), the element $\hat{w}_{ji}$ in the path constraint matrix $\hat{W}$ is set to zero.

As shown by the fourth row ($a_{ji}=-1$) in the block diagram 600, if the element $a_{ji}$ in the path knowledge matrix A which corresponds to the element $\hat{w}_{ji}$ satisfies the third condition, the element $\hat{w}_{ji}$ in the path constraint matrix $\hat{W}$ is set to 1.

It should be noted that the block diagram 600 further shows the symbol "N.A.", and this symbol represents such a case is impossible. For example, with reference to an intersection between the second row ($a_{ji}=-1$) and the third column ($k_{ji}=1$) in the block diagram 600, the intersection represents that the expert knowledge does not include knowledge on an edge relationship between the two variables $x_j$ and $x_i$, whereas the expert knowledge indicates there is a path between the two variables $x_j$ and $x_i$, which contradicts the definition of building the edge knowledge matrix and the path knowledge matrix. Therefore, "N.A." is used to represent that such a case is impossible.

According to one implementation of the present disclosure, in order to determine a path constraint in the directed graph represented by the matrix, first a path matrix describing a path between two variables among the plurality of variables may be determined based on the matrix; next, the path constraint may be determined based on the path knowledge matrix, the path matrix and the matrix.

In this implementation, the procedure for generating a path based on a plurality of edges in the directed graph will be involved during determining the path constraint in the directed graph represented by the matrix. Therefore, the path constraint matrix $\hat{W}$ describing the state of indirect causality between two variables among the plurality of variables may be determined based on the expert knowledge, and then the path constraint may be determined based on the path constraint matrix $\hat{W}$ and the matrix.

Specifically, the element $\beta_{ji}$ in the matrix represents an element at the location (j, i) in the matrix, that is, $\beta_{ji}$ represents the direct causality between the variables $x_j$ and $x_i$ among the plurality of variables. In order to obtain the indirect causality between two variables among the plurality of variables, the matrix may be subjected to a continued multiplication operation so as to obtain the indirect causality between two variables whose path length is larger than 1.

Description is presented on how to determine path matrices associated with paths with different lengths. According to one implementation of the present disclosure, paths with lengths K=2, 3, . . . , p−1 may be determined one by one. Specifically, a K-length path matrix associated with K-length paths may be determined, where the K-length path matrix represents a state of a K-length path between two nodes in the directed graph associated with the matrix, where K≤p−1, and p represents the number of the plurality of variables; and the path matrix may be determined based on the K-length path matrix.

Suppose K=2, then at this point a "2-length path matrix" may be determined based on continued multiplications of the above matrix B. Specifically, the 2-length path matrix may be determined based on B×B. According to one implementation of the present disclosure, the K-length path matrix associated with the path length K may be determined based on K multiplications of the matrix B. For the sake of description, the K-length path matrix may be denoted as $M^K$, and the K-length path matrix may be determined based on Formula 6 as below:

$$M^K=\Pi_{k=1}^{K}\text{abs}(B) \qquad \text{Formula 6}$$

In Formula 6, $\Pi_{k=1}^K$ denotes K continued multiplications, abs(B) denotes an absolute value of the matrix B.

According to one implementation of the present disclosure, where the K-length path matrix $M^K$ has been obtained, a sum of the obtained various K-length path matrices $M^K$ may be calculated so as to obtain a path matrix P describing paths with various lengths between two variables in the directed graph. Specifically, the path matrix P may be determined based on Formula 7 as below.

$$P = \Sigma_{k=1}^{P-1} M^K \qquad \text{Formula 7}$$

The element $p_{ji}$ at the location (j, i) in the matrix P may be calculated based on Formula 8 as below:

$$p_{ji} = \Sigma_{k=1}^{P-1} m_{ji}^K \qquad \text{Formula 8}$$

According to one implementation of the present disclosure, the problem formula associated with the current vector may $\beta_j$ be built based on Formula 9 as below:

$$PathLassoScore(j \mid V \setminus j) = \qquad \text{Formula 9}$$

$$\min_{\beta_j, \tilde{w}_j} \left\{ \|X_{j\cdot} - \beta_j \cdot x_{-j\cdot}\|_2^2 + \sum_{i \in V \setminus j} \tilde{w}_{ji} p_{ji} \right\}, \quad \text{s.t.} \quad \sum_{i=1}^p \tilde{w}_{ji} = \tilde{c}.$$

In Formula 9, $\beta_j$ denotes the current vector, $\tilde{w}_j$ denotes a portion associated with the current vector in the edge constraint matrix, $\|X_{j\cdot} - \beta_j X_{-j\cdot}\|_2^2$ denotes the fitness degree associated with the current vector $\beta_j$, $x_j$ denotes a portion associated with the current vector $\beta_j$ among the plurality of samples, $x_{-j}$ denotes a portion associated with vectors other than the current vector $\beta_j$ among the plurality of samples, and $$\sum_{i=1}^p \tilde{w}_{ji} = \tilde{c}$$

denotes a constraint condition, where $\tilde{c}$ is a predetermined parameter.

At this point, the expert knowledge constraint comprises an edge constraint vector and a path constraint vector associated with the current vector $\beta_j$ in the matrix, where the edge constraint vector is $$\sum_{i \in Q_s} \tilde{w}_{ji} |\beta_{ji}|,$$

and the path constraint vector is $$\sum_{i \in Q_s} \sum_{v \in \Pi_{>i}^{Q_s}} \hat{w}_{ji} p_{vi} |\beta_{jv}|.$$

In the context of the present disclosure, since it is desirable to describe the determined causality via the directed acyclic graph, a constraint condition may further be set so as to guarantee that no cycle is in the matrix. A variable among the plurality of variables may be considered one by one by building a causal sequence, so different causal sequences may be formed in order to achieve a target state.

Figure 7:
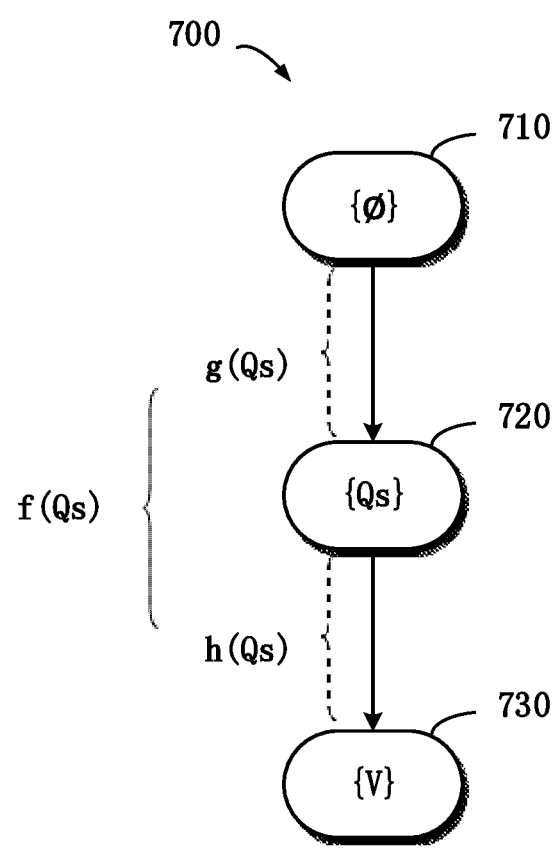
FIG. 7 schematically shows a block diagram for determining a score for reaching a target state from one state according to one implementation of the present disclosure.

FIG. 7 schematically shows a block diagram 700 for determining a score of reaching a target state from one state according to one implementation of the present disclosure. As depicted, based on basic principles of causal inference, suppose a current causal sequence is $Q_s$, and a state associated with the causal sequence $Q_s$ is as shown by a node 720. At this point, a score of reaching a target state (e.g., as shown by a node 730, the state is associated with a causal sequence comprising all variables) from the state associated with the current causal sequence $Q_s$ may be calculated according to a formula as below:

$$f(Q_s) = g(Q_s) + h(Q_s) \qquad \text{Formula 10}$$

In Formula 10, $f(Q_s)$ denotes a score of reaching the target state from the state associated with the current causal sequence $Q_s$, $g(Q_s)$ denotes a score of reaching the state associated with the current causal sequence $Q_s$ (as shown by the node 720) from an initial state (a null set as shown by a node 710), and $h(Q_s)$ denotes a predicted score of reaching the target state from the state associated with the current causal sequence $Q_s$.

As shown in FIG. 7, a target formula may be built based on Formula 11:

$$g(Q_s) = \sum_{j \in Q_s} PathLassoScore\left(j \mid \prod_{<j}^{Q_s}\right) \qquad \text{Formula 11}$$

$$PathLassoScore\left(j \mid \prod_{<j}^{Q_s}\right) =$$

$$\min_{\beta_j, Supp(\beta_j) \subseteq Q_s, \tilde{w}_{j\cdot}} \left\{ \|X_{j\cdot} - \beta_j \cdot X_{-j\cdot}\|_2^2 + \sum_{i \in Q_s} \tilde{w}_{ji} p_{ji} \right\} =$$

$$\min_{\beta_j, Supp(\beta_j) \subseteq Q_s, \tilde{w}_{j\cdot}} \left\{ \|X_{j\cdot} - \beta_j \cdot X_{-j\cdot}\|_2^2 + \sum_{i \in Q_s} \left( \tilde{w}_{ji} + \sum_{v \in \Pi_{<j}^{Q_s}} \tilde{w}_{jv} p_{iv} \right) |\beta_{ji}| \right\}$$

In Formula 11, $\Pi_{<j}^{Q_s}$ denotes a set of variables preceding the variable $x_j$ in a universal set, $Supp(\beta_j)$ denotes a support of the current vector $\beta_j$, $Q_s$ denotes a causal sequence associated with at least one part of the plurality of elements, $x_j$ denotes a portion associated with the current vector $\beta_j$ among the plurality of samples, $x_{-j}$ denotes a portion associated with vectors other than the current vector $\beta_j$ among the plurality of samples, $\| \|_2^2$ denotes a 2-norm operation, $\tilde{w}_{ji}$ denotes the element at the location (j, i) in the edge constraint matrix, $\beta_{ji}$ denotes the element at the location (j, i) in the matrix, $\hat{w}_{ji}$ denotes the element at the location (j, i) in the path constraint matrix, $\beta_{jv}$ denotes the element at the location (j, v) in the matrix, and | | denotes an absolute value operation.

Furthermore, the above formula includes constraints associated with an edge and associated with a path, respectively, so these two constraints may be set as different values. At this point, by setting the constraint associated with a path in Formula 11 as a different value, Formula 12 may be obtained as below:

$$PathLassoScore\left(j \mid \prod_{<j}^{Q_s}\right) = \text{Formula 12}$$

$$\min_{\beta_j, Supp(\beta_j) \subseteq Q_s, \tilde{w}_j} \left\{ \|X_j - \beta_j \cdot X_{-j}\|_2^2 + \sum_{i \in Q_s} \left(\tilde{w}_{ji} + \sum_{v \in \Pi_{<j}^{Q_s}} \tilde{w}_{jv} p_{iv}\right) |\beta_{ji}| \right\} =$$

$$\min_{\beta_j, Supp(\beta_j) \subseteq Q_s, \tilde{w}_j} \left\{ \|X_j - \beta_j \cdot X_{-j}\|_2^2 + \sum_{i \in Q_s} \tilde{w}_{ji} |\beta_{ji}| + \sum_{i \in Q_s} \sum_{v \in \Pi_{<j}^{Q_s}} \tilde{w}_{jv} p_{vi} |\beta_{jv}| \right\}$$

In Formula 12, $\Pi_{>i}^{Q_s}$ denotes nodes following the variable $x_i$ in $Q_s$, $$\sum_{i \in Q_s} \tilde{w}_{ji} |\beta_{ji}|$$

denotes a constraint associated with an edge, and $$\sum_{i \in Q_s} \sum_{v \in \Pi_{<j}^{Q_s}} \tilde{w}_{jv} p_{vi} |\beta_{jv}|$$

denotes a constraint associated with a path.

According to one implementation of the present disclosure, by performing a solution based on Formula 12, candidate results of various vectors in the matrix may be obtained. It should be noted that values of various elements in the matrix may be determined using a solution algorithm that is known in the prior art or that will be developed in future. In Formula 12, the edge constraint and the path constraint based on the expert knowledge have been introduced, so the existing expert knowledge may be utilized to help the causality determination between the plurality of variables. It should be noted that although Formula 12 includes the edge constraint $$\sum_{i \in Q_s} \tilde{w}_{ji} |\beta_{ji}|$$

and the path constraint $$\sum_{i \in Q_s} \sum_{v \in \Pi_{<j}^{Q_s}} \tilde{w}_{ji} p_{vi} |\beta_{jv}|,$$

according to one implementation of the present disclosure, the problem formula as built may comprise only the edge constraint, only the path constraint, or comprise both the edge constraint and the path constraint.

Figure 8:
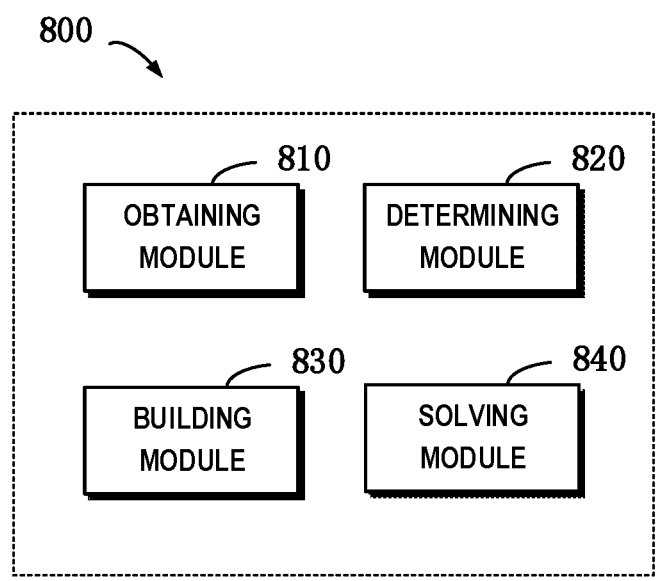
FIG. 8 schematically shows a block diagram of a device for determining a causality between a plurality of variables according to one implementation of the present disclosure.

FIG. 8 schematically shows a block diagram of a device 800 for determining a causality between a plurality of variables according to one implementation of the present disclosure. A device 800 is provided for determining a causality between a plurality of variables. The device comprises: an obtaining module 810 configured to, in response to a data set of a plurality of samples associated with the plurality of variables being collected, obtain a matrix describing the causality between the plurality of variables, each sample among the plurality of samples comprising data that corresponds to the plurality of variables; a determining module 820 configured to determine a fitness degree and an expert knowledge constraint which are associated with the causality based on the data set and the matrix, where the expert knowledge constraint comprises at least one of an edge constraint on a direct causality between two variables in the matrix and a path constraint on an indirect causality between two variables in the matrix; a building module 830 configured to build a problem formula describing the causality according to the determined fitness degree and expert knowledge constraint; and a solving module 840 configured to solve the built problem formula so as to obtain a candidate result of the matrix.

According to one implementation of the present disclosure, the determining module 820 is further configured to determine an edge constraint matrix of a state of a direct causality between two variables among the plurality of variables based on expert knowledge; and determine the edge constraint based on the edge constraint matrix and the matrix.

According to one implementation of the present disclosure, the determining module 820 is further configured to determine a path constraint matrix of a state of an indirect causality between two variables among the plurality of variables based on expert knowledge; and determine the path constraint based on the path constraint matrix and the matrix.

According to one implementation of the present disclosure, the determining module 820 is further configured to determine a path matrix describing a path between two variables among the plurality of variables based on the matrix; and determine the path constraint based on a path knowledge matrix, the path matrix and the matrix.

According to one implementation of the present disclosure, the determining module 820 is further configured to determine a K-length path matrix associated with a path having a length of K, where the K-length path matrix represents a state of a path having a length of K between two nodes in a directed graph associated with the matrix, where K≤p−1, p represents a number of the plurality of variables; and determine the path matrix based on the K-length path matrix.

According to one implementation of the present disclosure, the determining module 820 is further configured to determine an edge knowledge matrix describing a state of a direct causality between two variables among the plurality of variables based on the expert knowledge; and determine the edge constraint matrix based on the edge knowledge matrix.

According to one implementation of the present disclosure, the determining module 820 is further configured to: with respect to an element in the edge knowledge matrix, set the element as satisfying a first condition in response to the expert knowledge indicating that a direct causality exists between a first variable and a second variable associated with the element; set the element as satisfying a second condition in response to the expert knowledge indicating that no direct causality exists between the first variable and the second variable; and set the element as satisfying a third condition in response to the expert knowledge including no knowledge on a direct causality between the first variable and the second variable.

According to one implementation of the present disclosure, the determining module 820 is further configured to: with respect to an element in the path knowledge matrix, set the element as satisfying a first condition in response to the expert knowledge indicating that an indirect causality exists between a first variable and a second variable associated with the element; set the element as satisfying a second condition in response to the expert knowledge indicating that no indirect causality exists between the first variable and the second variable; and set the element as satisfying a third condition in response to the expert knowledge including no knowledge on an indirect causality between the first variable and the second variable.

According to one implementation of the present disclosure, the determining module 820 is further configured to: with respect to an element in the edge constraint matrix, set the element in the edge constraint matrix to a larger value in response to an element in the edge knowledge matrix, which corresponds to the element, equaling 0; set the element in the edge constraint matrix to zero in response to an element in the edge knowledge matrix, which corresponds to the element, satisfying a first condition; and set the element in the edge constraint matrix as associated with a predefined super-parameter in response to an element in the edge knowledge matrix, which corresponds to the element, satisfying a third condition.

According to one implementation of the present disclosure, the determining module 820 is further configured to: set an element $\tilde{w}_{ji}$ at a location (j, i) in the edge constraint matrix as $\tilde{w}_{ji} = |\rho_{ji}^{ols}|^{-\gamma}$, where $\rho_{ji}^{ols}$ is a predefined super-parameter calculated based on the data set, ols represents a least square operation, | | represents an absolute value operation, and γ represents a predetermined parameter.

According to one implementation of the present disclosure, the determining module 820 is further configured to determine a path knowledge matrix describing a state of an indirect causality between two variables among the plurality of variables based on the expert knowledge; and determine the path constraint matrix based on the path knowledge matrix.

According to one implementation of the present disclosure, the determining module 820 is further configured to: with respect to an element in the path constraint matrix, set the element in the path constraint matrix to a larger value in response to an element in the path knowledge matrix, which corresponds to the element, equaling 0; set the element in the path constraint matrix to zero in response to an element in the path knowledge matrix, which corresponds to the element, satisfying a first condition; and set the element in the path constraint matrix to 1 in response to an element in the path knowledge matrix, which corresponds to the element, satisfying a third condition.

According to one implementation of the present disclosure, the edge constraint vector is $$\sum_{i \in Q_s} \tilde{w}_{ji} |\beta_{ji}|,$$

and the path constraint vector is $$\sum_{i \in Q_s} \sum_{v \in \Pi_{>i}^{Q_s}} \hat{w}_{ji} p_{vi} |\beta_{jv}|.$$

According to one implementation of the present disclosure, the building module 830 is further configured to build a problem formula vector for the current vector $\beta_j$:

$$\min_{=\beta_{j.}, \text{Supp}(\beta_{j.}) \subseteq Q_s, \tilde{w}_{j.}} \left\{ \|X_{j.} - \beta_{j.} X_{-j.}\|_2^2 + \sum_{i \in Q_s} \tilde{w}_{ji} |\beta_{ji}| + \sum_{i \in Q_s} \sum_{v \in \Pi_{>i}^{Q_s}} \hat{w}_{ji} p_{vi} |\beta_{jv}| \right\},$$

where Supp($\beta_j$) represents a support of the current vector $\beta_j$, $Q_s$ represents a causal sequence associated with at least one part of the plurality of elements, $x_j$ represents a portion associated with the current vector $\beta_j$ among the plurality of samples, $x_{-j}$ represents a portion associated with vectors other than the current vector $\beta_j$ among the plurality of samples, $\| \|_2^2$ represents a 2-norm operation, $\tilde{w}_{ji}$ represents an element at a location (j, i) in the edge constraint matrix, $\beta_{ji}$ represents an element at a location (j, i) in the matrix, $\hat{w}_{ji}$ represents an element at a location (j, i) in the path constraint matrix, $p_{vi}$ represents an element at a location (j, i) in the path matrix, $\beta_{jv}$ represents an element at a location (j, v) in the matrix, | | represents an absolute value operation, and $\Pi_{>i}^{Q_s}$ represents nodes following node i in $Q_S$.

According to one implementation of the present disclosure, the built problem formula vector is solved so as to obtain a candidate result of the current vector $\beta_j$ of the matrix.

According to one implementation of the present invention, a system is provided for determining a causality between a plurality of variables, the system comprising: one or more processors; a memory coupled to at least one processor of the one or more processors; computer program instructions stored in the memory which, when executed by the at least one processor, cause the system to execute a method for determining a causality between a plurality of variables. The method comprises: in response to a data set of a plurality of samples associated with the plurality of variables being collected, obtaining a matrix describing the causality between the plurality of variables, each sample among the plurality of samples comprising data that corresponds to the plurality of variables; determining a fitness degree and an expert knowledge constraint which are associated with the causality based on the data set and the matrix, where the expert knowledge constraint comprises at least one of an edge constraint on a direct causality between two variables in the matrix and a path constraint on an indirect causality between two variables in the matrix; building a problem formula describing the causality according to the determined fitness degree and expert knowledge constraint; and solving the built problem formula so as to obtain a candidate result of the matrix.

According to one implementation of the present disclosure, determining the expert knowledge constraint comprises determining the edge constraint, which comprises: determining an edge constraint matrix of a state of a direct causality between two variables among the plurality of variables based on expert knowledge; and determining the edge constraint based on the edge constraint matrix and the matrix.

According to one implementation of the present disclosure, determining the expert knowledge constraint comprises determining the path constraint, which comprises: determining a path constraint matrix of a state of an indirect causality between two variables among the plurality of variables based on expert knowledge; and determining the path constraint based on the path constraint matrix and the matrix.

According to one implementation of the present disclosure, determining the path constraint based on the path constraint matrix and the matrix comprises: determining a path matrix describing a path between two variables among the plurality of variables based on the matrix; and determining the path constraint based on a path knowledge matrix, the path matrix and the matrix.

According to one implementation of the present disclosure, determining the path matrix comprises: determining a K-length path matrix associated with a path having a length of K, where the K-length path matrix represents a state of a path having a length of K between two nodes in a directed graph associated with the matrix, where K≤p−1, p represents the number of the plurality of variables; and determining the path matrix based on the K-length path matrix.

According to one implementation of the present disclosure, determining the edge constraint matrix comprises: determining an edge knowledge matrix describing a state of a direct causality between two variables among the plurality of variables based on the expert knowledge; and determining the edge constraint matrix based on the edge knowledge matrix.

According to one implementation of the present disclosure, determining the edge knowledge matrix comprises: with respect to an element in the edge knowledge matrix, setting the element as satisfying a first condition in response to the expert knowledge indicating that a direct causality exists between a first variable and a second variable associated with the element; setting the element as satisfying a second condition in response to the expert knowledge indicating that no direct causality exists between the first variable and the second variable; and setting the element as satisfying a third condition in response to the expert knowledge including no knowledge on a direct causality between the first variable and the second variable.

According to one implementation of the present disclosure, determining the path knowledge matrix comprises: with respect to an element in the path knowledge matrix, setting the element as satisfying a first condition in response to the expert knowledge indicating that an indirect causality exists between a first variable and a second variable associated with the element; setting the element as satisfying a second condition in response to the expert knowledge indicating that no indirect causality exists between the first variable and the second variable; and setting the element as satisfying a third condition in response to the expert knowledge including no knowledge on an indirect causality between the first variable and the second variable.

According to one implementation of the present disclosure, determining the edge constraint matrix based on the edge knowledge matrix comprises: with respect to an element in the edge constraint matrix, setting the element in the edge constraint matrix to a larger value in response to an element in the edge knowledge matrix, which corresponds to the element, equaling 0; setting the element in the edge constraint matrix to zero in response to an element in the edge knowledge matrix, which corresponds to the element, satisfying a first condition; and setting the element in the edge constraint matrix as associated with a predefined super-parameter in response to an element in the edge knowledge matrix, which corresponds to the element, satisfying a third condition.

According to one implementation of the present disclosure, setting the element in the edge constraint matrix as associated with the predefined super-parameter comprises: setting an element $\tilde{w}_{ji}$ at a location (j, i) in the edge constraint matrix as $\tilde{w}_{ji}=|\rho_{ji}^{ols}|^{-\gamma}$, where $\rho_{ji}^{ols}$ is a predefined super-parameter calculated based on the data set, ols represents a least square operation, | | represents an absolute value operation, and γ represents a predetermined parameter.

According to one implementation of the present disclosure, determining the path constraint matrix comprises: determining the path knowledge matrix describing a state of an indirect causality between two variables among the plurality of variables based on the expert knowledge; and determining the path constraint matrix based on the path knowledge matrix.

According to one implementation of the present disclosure, determining the path constraint matrix based on the path knowledge matrix: with respect to an element in the path constraint matrix, setting the element in the path constraint matrix to a larger value in response to an element in the path knowledge matrix, which corresponds to the element, equaling 0; setting the element in the path constraint matrix to zero in response to an element in the path knowledge matrix, which corresponds to the element, satisfying a first condition; and setting the element in the path constraint matrix to 1 in response to an element in the path knowledge matrix, which corresponds to the element, satisfying a third condition.

According to one implementation of the present disclosure, the expert knowledge constraint comprises an edge constraint vector and a path constraint vector which are associated with a current vector $\beta_j$ in the matrix, where the edge constraint vector is $$\sum_{i \in Q_s} \tilde{w}_{ji} |\beta_{ji}|,$$

and the path constraint vector is $$\sum_{i \in Q_s} \sum_{v \in \prod_{>i}^{Q_s}} \tilde{w}_{ji} p_{ji} |\beta_{jv}|.$$

According to one implementation of the present disclosure, building the problem formula describing the causality comprises: building a problem formula vector for the current vector $\beta_j$:

$$\min_{\beta_j, Supp(\beta_j) \subseteq Q_s, \tilde{w}_{j.}} \left\{ \|X_{j.} - \beta_{j.} X_{-j.}\|_2^2 + \sum_{i \in Q_s} \tilde{w}_{ji} |\beta_{ji}| + \sum_{i \in Q_s} \sum_{v \in \prod_{>i}^{Q_s}} \tilde{w}_{ji} p_{vi} |\beta_{jv}| \right\},$$

where Supp($\beta_j$) represents a support of the current vector $\beta_j$, $Q_s$ represents a causal sequence associated with at least one part of the plurality of elements, $x_j$ represents a portion associated with the current vector $\beta_j$ among the plurality of samples, $x_{-j}$ represents a portion associated with vectors other than the current vector $\beta_j$ among the plurality of samples, $\| \|_2^2$ represents a 2-norm operation, $\tilde{w}_{ji}$ represents an element at a location (j, i) in the edge constraint matrix, $\beta_{ji}$ represents an element at a location (j, i) in the matrix, $\hat{w}_{ji}$ represents an element at a location (j, i) in the path constraint matrix, $p_{vi}$ represents an element at a location (j, i) in the path matrix, $\beta_{jv}$ represents an element at a location (j, v) in the matrix, | | represents an absolute value operation.

According to one implementation of the present disclosure, solving the built problem formula so as to obtain the candidate result of the matrix comprises: solving the built problem formula vector so as to obtain a candidate result of the current vector $\beta_j$ of the matrix.

According to one implementation of the present disclosure, a computer program product is provided. The computer program product is tangibly stored on a non-transitory computer-readable medium and comprises machine-executable instructions which, when executed, cause a machine to implement steps of the method described above.

The various implementations implementing the method of the present invention have been described with reference to the accompanying drawings. Those skilled in the art may appreciate that the method may be implemented in software, hardware or a combination thereof. Moreover, those skilled in the art may appreciate that a device based on the same inventive concept may be provided by implementing respective steps of the method in software, hardware or combination of software and hardware. Even if the device is the same as a general-purpose processing device in hardware structure, the functionality of software contained therein makes the device exhibit distinguishing characteristics over the general-purpose processing device, thereby forming a device according to the various embodiments of the present invention. The device of the present invention comprises several means or modules, which are configured to execute corresponding steps. By reading this specification, those skilled in the art may understand how to write a program to implement actions performed by the means or modules. Since the device and the method are based on the same inventive concept, like or corresponding implementation details also apply to the means or modules corresponding to the method. Since a detailed and complete description has been presented above, details may be ignored below.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, where the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for determining a causality between a plurality of variables, the method comprising:
    in response to a data set of a plurality of samples associated with the plurality of variables being collected, obtaining a matrix describing the causality between the plurality of variables, each sample among the plurality of samples comprising data that corresponds to the plurality of variables;
    determining a fitness degree and an expert knowledge constraint which are associated with the causality based on the data set and the matrix, wherein the expert knowledge constraint comprises at least one of an edge constraint on a direct causality between two variables in the matrix and a path constraint on an indirect causality between two variables in the matrix;
    building a problem formula describing the causality according to the determined fitness degree and expert knowledge constraint;
    solving the built problem formula so as to obtain a candidate result of the matrix; and
    determining the causality between the plurality of variables based on the obtained candidate result of the matrix,
    wherein the plurality of variables include information about an abnormal detection in a control system.

2. The method of claim 1, wherein determining the expert knowledge constraint comprises determining the edge constraint, comprising:
    determining an edge constraint matrix of a state of a direct causality between two variables among the plurality of variables based on expert knowledge; and
    determining the edge constraint based on the edge constraint matrix and the matrix.

3. The method of claim 2, wherein determining the expert knowledge constraint comprises determining the path constraint, comprising:
    determining a path constraint matrix of a state of an indirect causality between two variables among the plurality of variables based on expert knowledge; and
    determining the path constraint based on the path constraint matrix and the matrix.

4. The method of claim 3, wherein determining the path constraint based on the path constraint matrix and the matrix comprises:
    determining a path matrix describing a path between two variables among the plurality of variables based on the matrix; and
    determining the path constraint based on a path knowledge matrix, the path matrix and the matrix.

5. The method of claim 4, wherein determining the path matrix comprises:
    determining a K-length path matrix associated with a path having a length of K, wherein the K-length path matrix represents a state of a path having a length of K between two nodes in a directed graph associated with the matrix, wherein K≤p−1, p represents a number of the plurality of variables; and
    determining the path matrix based on the K-length path matrix.

6. The method of claim 4, wherein determining the edge constraint matrix comprises:
   determining an edge knowledge matrix describing a state of a direct causality between two variables among the plurality of variables based on the expert knowledge; and
   determining the edge constraint matrix based on the edge knowledge matrix.

7. The method of claim 6, wherein determining the edge knowledge matrix comprises: with respect to an element in the edge knowledge matrix,
   setting the element as satisfying a first condition in response to the expert knowledge indicating that a direct causality exists between a first variable and a second variable associated with the element;
   setting the element as satisfying a second condition in response to the expert knowledge indicating that no direct causality exists between the first variable and the second variable; and
   setting the element as satisfying a third condition in response to the expert knowledge including no knowledge on a direct causality between the first variable and the second variable.

8. The method of claim 6, wherein determining the path knowledge matrix comprises: with respect to an element in the path knowledge matrix,
   setting the element as satisfying a first condition in response to the expert knowledge indicating that an indirect causality exists between a first variable and a second variable associated with the element;
   setting the element as satisfying a second condition in response to the expert knowledge indicating that no indirect causality exists between the first variable and the second variable; and
   setting the element as satisfying a third condition in response to the expert knowledge including no knowledge on an indirect causality between the first variable and the second variable.

9. The method of claim 6, wherein determining the edge constraint matrix based on the edge knowledge matrix comprises: with respect to an element in the edge constraint matrix,
   setting the element in the edge constraint matrix to a larger value in response to an element in the edge knowledge matrix, which corresponds to the element, equaling 0;
   setting the element in the edge constraint matrix to zero in response to an element in the edge knowledge matrix, which corresponds to the element, satisfying a first condition; and
   setting the element in the edge constraint matrix as associated with a predefined super-parameter in response to an element in the edge knowledge matrix, which corresponds to the element, satisfying a third condition.

10. The method of claim 9, wherein setting the element in the edge constraint matrix as associated with the predefined super-parameter comprises:
    setting an element $\tilde{w}_{ji}$ at a location (j, i) in the edge constraint matrix as $\tilde{w}_{ji}=|\rho_{ji}^{ols}|^{-\gamma}$, wherein $\rho_{ji}^{ols}$ is a predefined super-parameter calculated based on the data set, ols represents a least square operation, | | represents an absolute value operation, and $\gamma$ represents a predetermined parameter.

11. The method of claim 6, wherein determining the path constraint matrix comprises:
    determining the path knowledge matrix describing a state of an indirect causality between two variables among the plurality of variables based on the expert knowledge; and
    determining the path constraint matrix based on the path knowledge matrix.

12. The method of claim 11, wherein determining the path constraint matrix based on the path knowledge matrix: with respect to an element in the path constraint matrix,
    setting the element in the path constraint matrix to a larger value in response to an element in the path knowledge matrix, which corresponds to the element, equaling 0;
    setting the element in the path constraint matrix to zero in response to an element in the path knowledge matrix, which corresponds to the element, satisfying a first condition; and
    setting the element in the path constraint matrix to 1 in response to an element in the path knowledge matrix, which corresponds to the element, satisfying a third condition.

13. The method of claim 12, wherein the expert knowledge constraint comprises an edge constraint vector and a path constraint vector which are associated with a current vector $\beta_j$ in the matrix, wherein
    the edge constraint vector is $$\sum_{i \in Q_s} \tilde{w}_{ji}|\beta_{ji}|, \sum_{v \in \Pi_{>i}^{Q_s}}$$

and the path constraint vector is $$\sum_{i \in Q_s} \sum_{v \in \Pi_{>i}^{Q_s}} \hat{w}_{ji} p_{ji}|\beta_{jv}|.$$

14. The method of claim 13, wherein building the problem formula describing the causality comprises: building a problem formula vector for the current vector $\beta_j$:

$$= \min_{\beta_j, Supp(\beta_j) \subseteq Q_s, \tilde{w}_{j.}} \left\{ \|X_{j.} - \beta_j . X_{-j.}\|_2^2 + \sum_{i \in Q_s} \tilde{w}_{ji}|\beta_{ji}| + \sum_{i \in Q_s} \sum_{v \in \Pi_{>i}^{Q_s}} \hat{w}_{ji} p_{vi}|\beta_{jv}| \right\},$$

wherein $Supp(\beta_j)$ represents a support of the current vector $\beta_j$, $Q_S$ represents a causal sequence associated with at least one part of the plurality of elements, $x_j$ represents a portion associated with the current vector $\beta_j$ among the plurality of samples, $x_{-j}$ represents a portion associated with vectors other than the current vector $\beta_j$ among the plurality of samples, $\| \|_2^2$ represents a 2-norm operation, $\tilde{w}_{ji}$ represents an element at a location (j, i) in the edge constraint matrix, $\beta_{ji}$ represents an element at a location (j, i) in the matrix, $\hat{w}_{ji}$ represents an element at a location (j, i) in the path constraint matrix, $p_{vi}$ represents an element at a location (j, i) in the path matrix, $\beta_{jv}$ represents an element at a location (j, v) in the matrix, | | represents an absolute value operation, and $\Pi_{>i}^{Q_s}$ represents nodes following node i in $Q_S$.

15. The method of claim 14, wherein solving the built problem formula so as to obtain the candidate result of the matrix comprises:

solving the built problem formula vector so as to obtain a candidate result of the current vector $\beta_j$ of the matrix.

16. A computer program product, tangibly stored on a non-transitory computer-readable medium and comprising machine-executable instructions, which, when executed, cause a machine to implement steps of a method according to claim 1.

* * * * *